(12) United States Patent
Glownia et al.

(10) Patent No.: US 6,665,039 B1
(45) Date of Patent: Dec. 16, 2003

(54) METHOD AND STRUCTURE FOR MINIMIZING SHADOWING DURING PHOTO-CURING OF SEALING MATERIAL BY MAKING SHADOW-PRODUCING PATTERN TRANSPARENT

(75) Inventors: James H. Glownia, Somers, NY (US); Shui-Chih Alan Lien, Briarcliff Manor, NY (US); Robert Jacob von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 09/635,661

(22) Filed: Aug. 10, 2000

(51) Int. Cl.$^7$ .................. G02F 1/1339; G02F 1/1343
(52) U.S. Cl. .................. 349/153; 349/139; 349/149; 349/190
(58) Field of Search .................. 349/190, 153, 349/139, 149

(56) References Cited

U.S. PATENT DOCUMENTS

| | | | | |
|---|---|---|---|---|
| 5,317,434 A | * | 5/1994 | Ohara | 359/68 |
| 5,677,924 A | * | 10/1997 | Bestwick | 372/96 |
| 5,754,267 A | * | 5/1998 | Izumi | 349/153 |
| 5,793,461 A | * | 8/1998 | Inou | 349/153 |
| 5,898,041 A | * | 4/1999 | Yamada et al. | 522/81 |
| 6,118,509 A | * | 9/2000 | Miyake | 349/153 |
| 6,179,679 B1 | * | 1/2001 | von Gutfeld et al. | 445/25 |
| 6,195,193 B1 | * | 2/2001 | Anderson et al. | 359/265 |
| 6,268,896 B1 | * | 7/2001 | Takasaki et al. | 349/110 |
| 6,284,087 B1 | * | 9/2001 | von Gutfeld et al. | 156/275.5 |

* cited by examiner

Primary Examiner—Tarifur Chowdhury
Assistant Examiner—Andrew Schechter
(74) Attorney, Agent, or Firm—Robert M. Trepp, Esq.; McGinn & Gibb, PLLC

(57) ABSTRACT

A structure (and method for forming the structure) includes an electrically conducting pattern on at least one of two substrates to be combined with the other of the two substrates via a seal. The conducting pattern in a region of the seal for attaching the two substrates is at least transmissive to radiation for curing the seal under the pattern to affix the two substrates.

24 Claims, 4 Drawing Sheets

METHOD AND STRUCTURE FOR MINIMIZING SHADOWING DURING PHOTO-CURING OF SEALING MATERIAL BY MAKING SHADOW-PRODUCING PATTERN TRANSPARENT

CROSS-REFERENCE TO RELATED APPLICATIONS

The present application relates to U.S. patent application Ser. No. 09/425,701, to Robert J. von Gutfeld et al., and to U.S. patent application Ser. No. 09/425,711, to Robert J. von Gutfeld et al., each of which is incorporated herein by reference.

BACKGROUND OF THE INVENTION

1. Field of the Invention

The present invention generally relates to a liquid crystal display panel, and more particularly to a method and structure that permits photon sealing of substrates, such as flat panel liquid crystal display (LCD) substrates, in a manner that prevents shadowing.

2. Description of the Related Art

Previously, conventional methods fabricated liquid crystal panels by attaching two panel substrates (e.g., with one panel containing the circuitry, and the other panel containing the color filter) and bonding them together with a thermally-curable glue seal. The glue seal is applied near the periphery of the panel, leaving on the order of a few millimeters of the panel's periphery without a glue seal.

Bonding generally occurs by baking the assembly and thermally curing the polymeric glue seal, typically at temperatures on the order of 180–200° C. for periods on the order of 1–3 hours.

After baking, the assembled panel is placed in a vacuum chamber where the end containing the open portion is dipped into the liquid crystal. The vacuum chamber is then back filled with gas (e.g., nitrogen) to force the liquid crystal into the narrow space (e.g., typically on the order of about 5 microns) between the two substrates.

After filling, the opening is closed off by a second sealant that polymerizes with UV radiation, thereby forming the final seal.

Recently, U.S. Pat. No. 5,263,888, incorporated herein by reference, disclosed a process which no longer utilizes a nearly fully sealed panel prior to filling with a liquid crystal.

Instead, one substrate placed in a horizontal position receives droplets of liquid crystal and a fillet of peripheral glue seal. The second substrate is placed over the first, aligned with respect to the first substrate and then is subjected to ultraviolet (UV) radiation which cures the glue seal. This process has the potential for saving many hours of process time since the baking and vacuum fill procedure associated with the conventional method previously described take many hours.

However, a problem with the above-described method of U.S. Pat. No. 5,263,888 is that metal signal and gate lines that lead from the interior of the panel circuitry to the exterior are "shadowed" upon exposure to the UV radiation used for curing. That is, shadowing normally occurs when the electrical lines in the region of the glue seal are opaque to the radiation used for curing the glue seal, preventing the optical radiation from curing the glue seal in the region directly below and in contact with that portion of the electrically conducting lines.

Thus, when the glue seal is photolytically activated to cause it to set or polymerize, any region shadowed by a thin film or other circuitry on the inside of the upper panel will cause some shadowing on the surface below when the radiation is incident on the upper panel. The shadowing can result in the glue immediately in contact with the thin film circuitry to remain uncured. This may well result in a deleterious effect of having the glue come in contact with, for example, a liquid crystal material, thereby leading to a "poisoning" (contamination) of the liquid crystal.

It is generally not possible to UV expose from the second substrate to avoid the shadowing since that substrate contains a peripheral border that is essentially totally opaque.

Further, while other suggestions have been put forth to cure this shadowed region (e.g., see the above-mentioned copending U.S. patent applications Ser. No. 09/425,701 and 09/425,711 to Robert J. von Gutfeld et al., incorporated herein by reference), no simple method has been suggested to avoid the shadowing problem.

SUMMARY OF THE INVENTION

In view of the foregoing and other problems of the conventional methods and structures, an object of the present invention is to provide a method and structure in which the above-described shadowing problem is overcome.

In a first aspect of the present invention, a structure (and method of forming the structure) includes an electrically conducting pattern on at least one of two substrates to be combined with the other of the two substrates via a seal. The conducting pattern in the region of the seal for attaching the two substrates is at least transmissive to a radiation for curing the seal under the pattern to affix the two substrates.

In a second aspect, a liquid crystal display (LCD) panel includes first and second substrates coupled together by a seal, a liquid crystal material formed between the first and second substrates, and an electrically conducting pattern formed on at least one of the first and second substrates such that the conducting pattern in a region of the seal comprises a material at least transmissive to radiation for curing the seal under the pattern, in at least the region of the seal, to couple the two substrates together.

With the unique and unobvious features of the present invention, a method and structure are provided that utilize transmissive electrical lines that are at least partially transmitting to the UV radiation required for photolytically curing the glue seal. Preferably, these lines are very short (e.g., on the order of about 0.5 to about 3 mm) and only extend in the region of the glue seal.

Further, no additional photolithographic step is required for this pattern so that cost is kept at a minimum.

Preferably, any one of a number of materials can be used for the signal and gate lines in the peripheral region of the glue seal so long as such materials permit sufficient UV radiation to penetrate through these lines to seal the glue that lies immediately beneath these lines.

Thus, with the invention, shadowing is eliminated and the glue seal will be cured at all locations where UV radiation is incident in the peripheral region to form a good permanent seal.

BRIEF DESCRIPTION OF THE DRAWINGS

The foregoing and other purposes, aspects and advantages will be better understood from the following detailed description of a preferred embodiment of the invention with reference to the drawings, in which:

FIGS. 5(a)–5(b) illustrate the %transmission vs. wavelength for both a glass substrate and the same glass substrate coated with unannealed indium tin oxide (ITO), while FIG. 5(b) shows the same parameters as in FIG. 5(a) except that now the ITO-coated substrate has been annealed.

DETAILED DESCRIPTION OF PREFERRED EMBODIMENTS OF THE INVENTION

Figure 1:
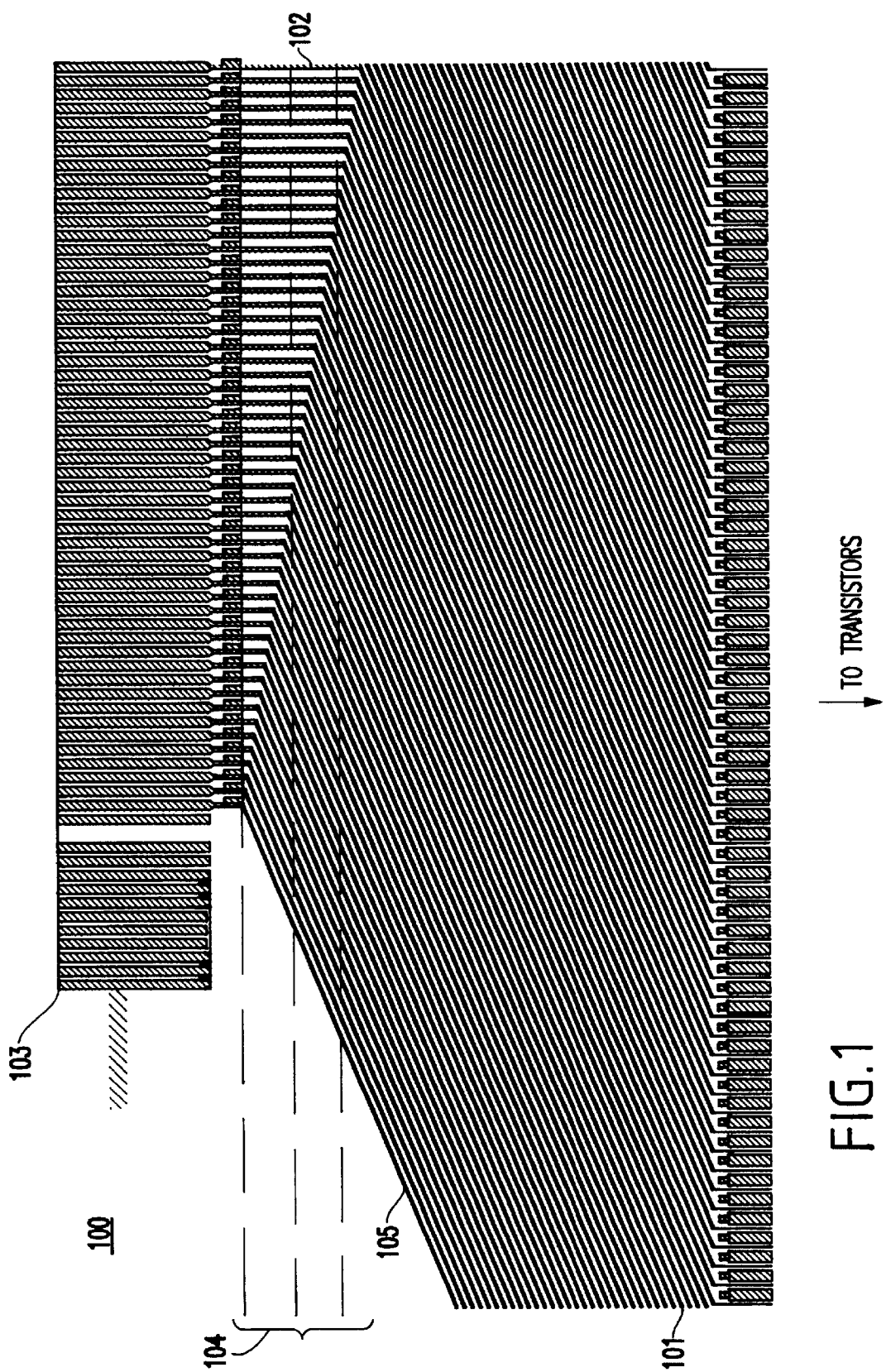
FIG. 1 shows a view of the data/signal lines near the periphery of a display panel in a region where a glue is applied for sealing two substrates that comprise the display panel.

Referring now to the drawings, and more particularly to FIGS. 1-5(b), there are shown preferred embodiments of the method and structures according to the present invention.

Preferred Embodiment

Generally, a key part of the present invention is the use of a transmissive electrode material in the region containing the glue seal, thereby preventing the current carrying lines extending from the interior of the panel to the outside from causing shadowing.

Thus, the present invention focuses on reducing or eliminating an important problem encountered in using a photolytically-activated seal in the assembly of liquid crystal display panels.

However, it should be obvious to those skilled in the art after reading the present specification that the invention is also relevant to any device that requires sealing by a photolytic process where it is important that there be no leakage pathway between the region contained within the substrates and the region external to a glue seal that binds the two or more substrates. As mentioned above, the cause of leakage is generally due to a problem referred to as "shadowing".

As shown in FIG. 1, in substrate 100, metal lines 101 lead from each transistor (not shown) to an edge or peripheral region 103 of substrate 100 where a glue seal 1040 is applied in a glue seal region 104, to provide a seal with a second substrate 1000 (not shown in FIG. 1 but shown in FIG. 4) (e.g., usually referred to as the "color filter".

The shape of the pattern that the lines take near the edge 103 of the panel, is noted. That is, the array of lines 101 in region 103 are both approximately perpendicular to an edge surface 103, but also lead into a fan-out region 105. Fan-out region 105 includes portions of lines 101 which connect to transistors (not shown).

An area near the glue seal region 104 including and very near (e.g., within approximately 1 mm) to fan out region 105 is a main focus of the present invention. All of the lines in this region are conventionally metal lines, usually aluminum,(or others such as chromium or molybdenum) on the order of about 2000 Å in thickness (or another appropriate thickness).

Figure 3A:
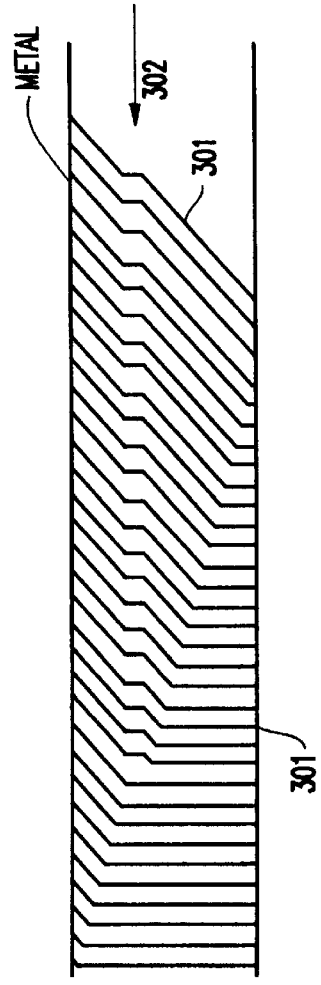
FIG. 3(a) shows a design which is part of the present invention that substitutes light-transmissive lines in the region immediate to the glue seal.

However, as shown in FIG. 3(a), within substrate 100 there is also a substantial region of a patterned radiation transmissive electrical conductor material, generally indium tin oxide (ITO), indium zinc oxide (IZO) or the like (e.g., shown in FIG. 3(a) and discussed below). This material provides an electrical contact between the two substrates 100 and 1000 (in the color filter shown in FIG. 4) in certain predetermined regions, not relevant in detail to the present discussion.

It should also be clear to those skilled in the art that there exists many other light-transmissive electrically conducting materials such as $GaInO_3$. Thus, the present invention is not limited to using ITO or IZO.

As previously mentioned, the present invention focusses on the data/signal lines in the region 104 of glue seal 1040 (i.e., the general region of the glue seal 1040). Here, the lines are fabricated such that line segments constituting the metal lines 101 are altered to become electrically conducting and fabricated from material that is transmissive to the radiation used for curing the glue seal 1040.

Figure 4:
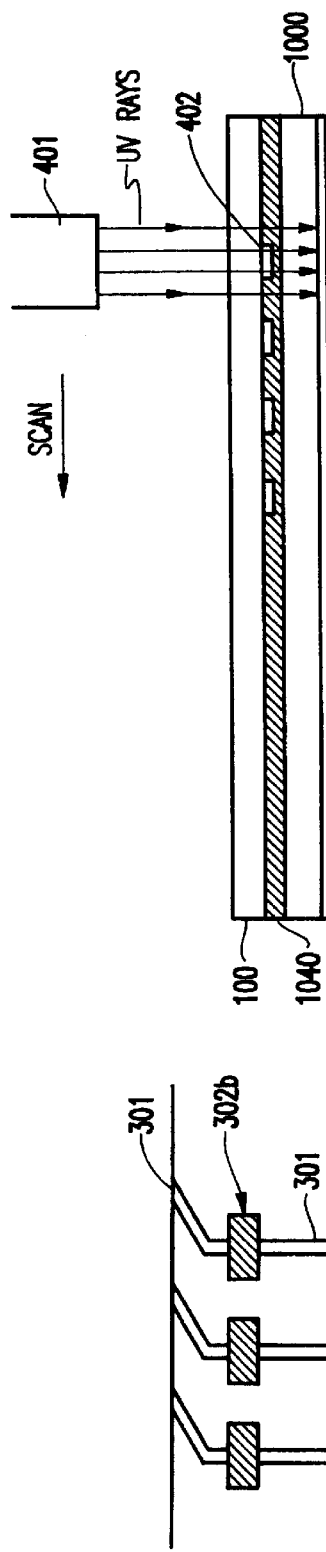
FIG. 4 illustrates a cross-sectional view of the substrates assembled and a radiation source that cures the glue without shadowing according to the method of the present invention of forming the LCD panel.

Physically, this change is accomplished most efficiently by patterning the ITO in one step to include that which is needed in the interior of substrate 100 shown in FIG. 4 as well as the small portions needed around the peripheral edge 103.

Figure 2:
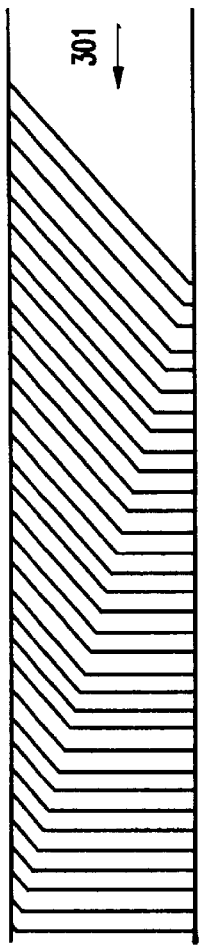
FIG. 2 illustrates a conventional fan-out design of the display panel.

A more detailed view of this region together with the changes in the lines to prevent shadowing, according to the present invention, are shown in FIG. 3(a). FIG. 2 illustrates the conventional fan-out design as a basis of comparison.

Shown are regions that are now ITO (or IZO, $GaInO_3$, etc.) 302, instead of metal 301. Regions 302 are expanded in width compared to the metallized portions of the line 101 in the peripheral region 101 so that a minimum resistance is added to data and/or signal lines in order to minimize the delay introduced by a higher RC (resistance x capacitance) time constant.

Figure 3B:
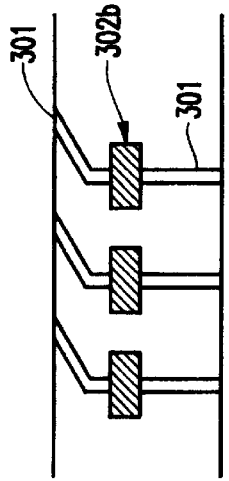
FIG. 3(b) illustrates the radiation-transmissive line portions of FIG. 3(a) in greater detail.

FIG. 3(b) shows a more detailed view (and modification) of FIG. 3(a) and shows that the line segment 302 may have a greater width than that of metal line 301. As shown, a small bridge 302b is formed of ITO, IZO, $GaInO_3$, etc., between the metal line 301 which then is continued past the ITO 302b for good electrical contact. The reason why the radiation transmissive material may be advantageously made wider than the metal line is that the ITO/IZO/$GaInO_3$ is generally not as conductive as the metal. Thus, the greater width helps to minimize the total resistance of the metal lines/ITO (or IZO and $GaInO_3$) material. By providing a greater width (more real estate) as shown in FIG. 3(b), greater conductivity is provided since the resistance of the ITO/IZO/$GaInO_3$ portion is decreased.

Thus, the transmissive material may have approximately the same width or advantageously a greater width than the metal lines, as shown in FIG. 3(a) by reference numeral 302.

In place of the radiation transmissive materials mentioned above, it is also possible to use very thin metal films in region 104 (e.g., formed of aluminum) and having a thickness of less than 200 Å and more preferably between 100 Å to about 200 Å) can be transmissive to the required radiation for curing glue seals.

For example, aluminum having a thickness under 200 Å is transmissive to UV radiation in the range of about 350 nm, a UV wavelength typically required for the polymerization of many common glue seals 1040.

FIG. 4 shows a cross-sectional view of the two substrates 100 and 1000 assembled and aligned with the glue seal 1040 in place, to form an LCD panel.

Schematically as shown in the cross-section of FIG. 4, a radiation source 401 is scanned around the peripheral region 104 of glue seal 1040 (not shown in FIG. 4 to cure the glue seal 1040. As indicated, some radiation now penetrates through the lithographically-placed transmissive segments 402, to cure the glue seal immediately in contact with segments 402.

Thus, the present invention prevents shadowing and assures that all of the glue is cured substantially everywhere along the periphery to avoid contamination between the glue and the liquid crystal material.

The amount of UV radiation that is transmitted by a 1,000 Å thick ITO film can be estimated from the paper by Forouhi et al., in *Proc. of SPIE*, Vol. 2725, 1996, pp. 471–477, incorporated herein by reference in its entirety. Based on the data of this reference, the UV reflectivity, R, is about 30%. The total UV radiation at 350 nm, $I_p$, that can be expected to penetrate through the ITO film for an incident intensity, $I_0$, is then given by, $$I_p = (1-R)I_0 e^{-\alpha x}$$

where $\alpha x$ can be shown to be equal to 0.35 for the 1000 Å film. Then, $I^p \sim 0.5\ I_0$. Thus, the intensity of the UV radiation to cure the glue seal can be adjusted to make certain that sufficient radiation passes through the ITO to produce curing of the glue seal under the ITO.

As discussed below and shown in FIGS. 5(a)–5(b), transmission of ITO on panel glass was measured using a transmission spectrometer. For a 500 Å film of annealed ITO, transmission of 50% was measured at a wavelength of ~350 nm which is somewhat less than would be predicted from the above-mentioned Forouhi, et al. reference. However, the present measurements refer to glass and ITO as used by the present assignee in its panel manufacture.

Figure 5A:
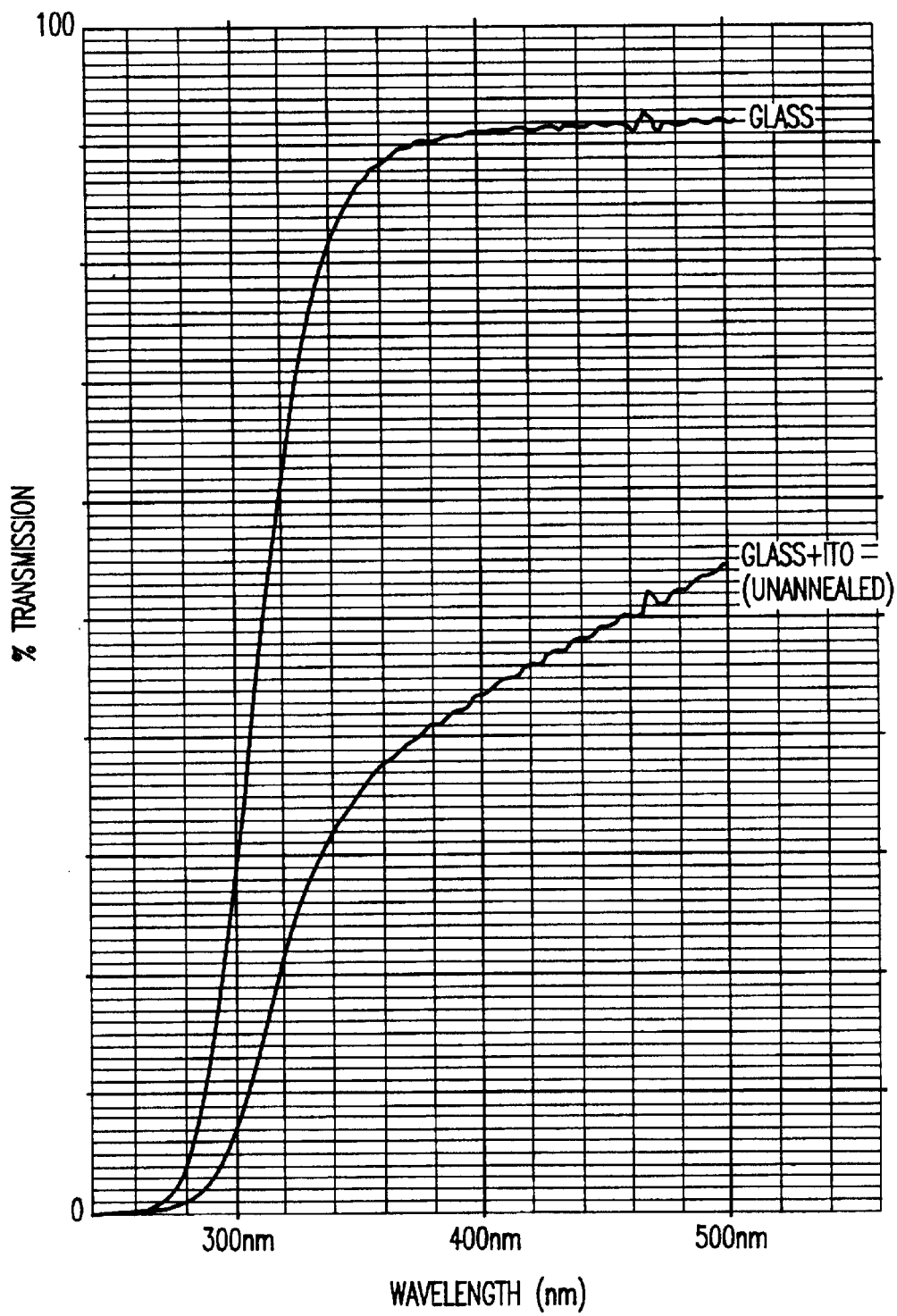
Figure 5B:
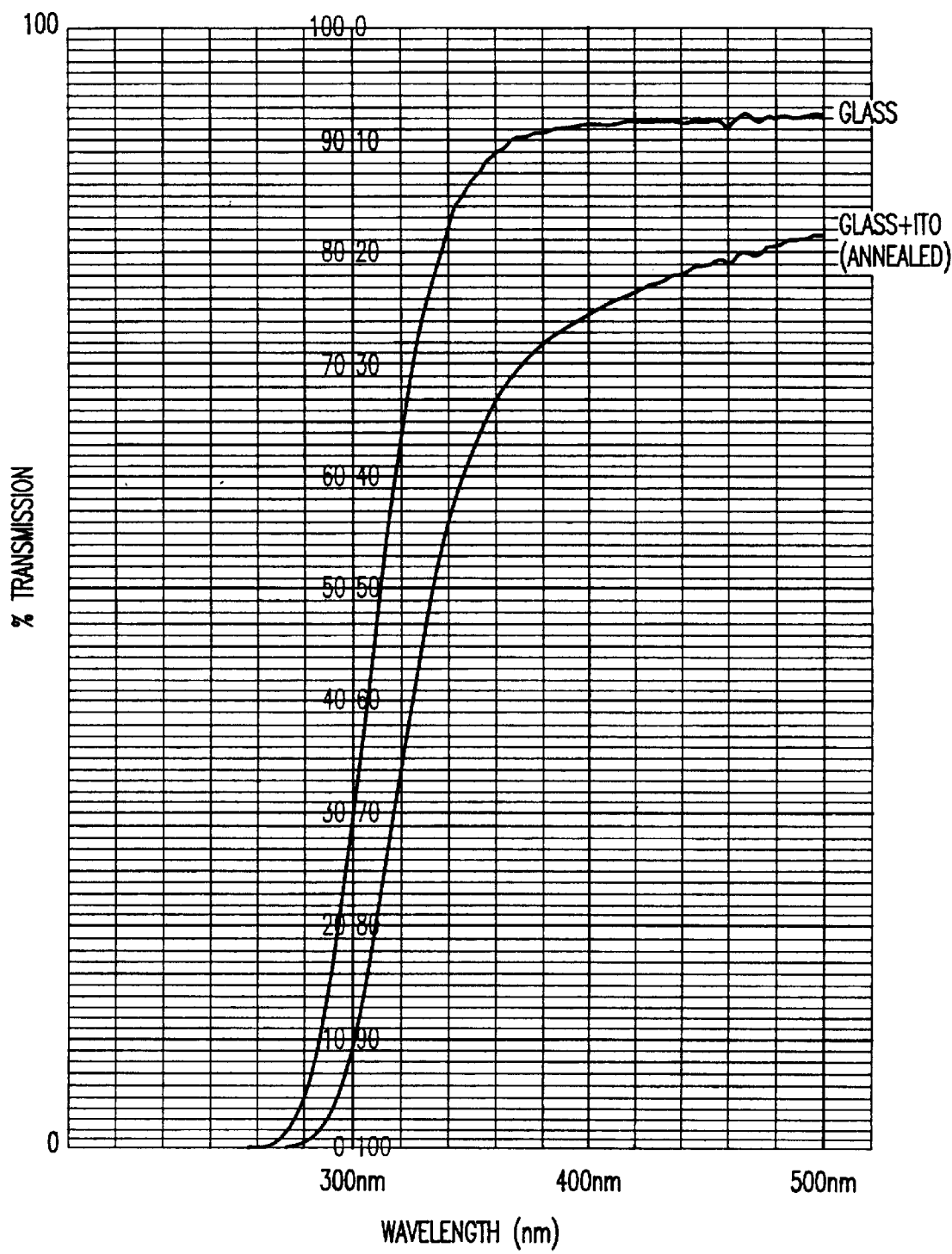

FIG. 5 (a) shows the %transmission vs. wavelength for both a glass substrate and the same glass substrate coated with unannealed ITO while FIG. 5(b) shows the same parameters as in FIG. 5(a) except that now the ITO coated substrate has been annealed (greatly enhancing the short wavelength transmission). The UV portion of the spectrum generates the initiators to effect a cure of the sealant material, and hence the annealed ITO is preferable (does not greatly attenuate the UV transmission). In general, annealed ITO is used as the transparent electrode material.

Another means for minimizing or even eliminating shadowing can be achieved by modifying the shape of the lines that make up the signal-gate lines near the outer periphery of the panel. These lines are tapered to become very narrow over a short distance, thereby leaving a region that may be as narrow as about one to two microns over a distance on the order of about 500 microns under the glue seal. This small region of taper leaves a very narrow opening, if any for the sealant to come in contact with the liquid crystal. Thus, even if the glue is not completely cured under this region, the chance for contamination before the final anneal step will be extremely small.

Thus, as is clear from above, the inventive structure is such that photons are not blocked from accessing glue seals in the region of electrical lines extending from the interior of the panel to regions exterior to the liquid crystal panel. The novel structure assures that all the glue is cured by the incident photons used to cause polymerization of the glue seal. This prevents any long-term contamination between the glue seal and the liquid crystal that can cause the liquid crystal to become contaminated and defective.

While the invention has been described in terms of several preferred embodiments, those skilled in the art will recognize that the invention can be practiced with modification within the spirit and scope of the appended claims.

It is noted that the invention is not restricted to any particular type of sealant or glue, as would be known by one of ordinary skill in the art taking the present application as a whole.

Further, it is noted that the conductive lines could be formed entirely of the light-transmissive material (e.g., ITO, IZO, GaInO$_3$, etc.). However, the resistance of such a configuration would be higher than using a hybrid arrangement as described above using the radiation transmissive material only at the region of the glue seal.

What is claimed is:

1. A structure, comprising:
    an electrically conducting pattern on at least one of two substrates to be combined with the other of the two substrates via a seal,
    said electrically conducting pattern comprising an array of electrically conducting lines alternating with open spaces, said conducting lines being opaque to optical radiation, each of said conducting lines being open in a specified region and reconnected by a separate deposit overlapping both ends of said electrically conducting lines,
    said deposit comprising optically transparent or partially transparent electrically conducting material that restores electrical continuity of said conducting lines and such that
    said conducting pattern in a region of the seal for attaching the two substrates is at least partially transmissive to radiation required for curing said seal under said pattern to affix said two substrates,
    wherein said array of electrically conducting lines includes metal lines leading from a transistor to a peripheral region of one of said substrates at which said seal is applied, and
    wherein said electrically conducting lines are reconnected by said deposit in a fan-out region.

2. The structure of claim 1, wherein said deposit comprises indium tin oxide (ITO).

3. The structure of claim 1, wherein said deposit comprises indium zinc oxide (IZO).

4. The structure of claim 1, wherein said deposit comprises GaInO$_3$.

5. The structure of claim 1, wherein said deposit comprises a transmissive electrode material in the region containing the seal, thereby preventing current carrying lines extending from an interior of the structure to an exterior of the structure from causing shadowing.

6. The structure of claim 1, wherein said seal comprises a photolytically-activated seal.

7. The structure of claim 1, wherein said seal is photolytically activated to cause said seal to cure.

8. The structure of claim 1, wherein said array of metal lines including said plurality of fan-out lines in said fan-out region are substantially perpendicular to an edge surface.

9. The structure of claim 8, wherein said metal lines comprise aluminum.

10. The structure of claim 8, wherein a line segment of a material of said deposit is equal in width to that of a metal line of said conducting pattern.

11. The structure of claim 1, wherein, in predetermined regions of said substrates, line segments of said electrically conducting pattern are altered to remain electrically conducting and are fabricated from a material of said deposit that is transmissive to the radiation used for curing said seal.

12. The structure of claim 1, wherein a material of said deposit is patterned in one step to include a portion for an interior of said substrates as well as portions for a peripheral edge thereof.

13. The structure of claim 1, wherein a material of said deposit is formed so as to have an expanded width compared to metallized portions of a line segment of said conducting pattern in a peripheral region.

14. The structure of claim 1, wherein a line segment of a material of said deposit is equal in width to that of a metal line of said conducting pattern, and includes a bridge formed of indium tin oxide (ITO) connecting endpoints of the metal line.

15. The structure of claim 1, wherein a line segment of a material of said deposit is equal in width to that of a metal line of said conducting pattern, and includes a bridge formed.

16. The structure of claim 1, wherein a line segment of a material of said deposit is equal in width to that of a metal line of said conducting pattern, and includes a bridge formed of $GaInO_3$ connecting endpoints of the metal line.

17. The structure of claim 1, wherein a material of said deposit comprises a very thin metal film having a thickness under approximately 200 Å.

18. The structure of claim 8, wherein a width of a line segment of said electrically conducting pattern is greatest in said region of said seal.

19. The structure of claim 1, wherein said array of electrically conducting lines includes a plurality of fan-out lines in said fan-out region.

20. The structure of claim 1, wherein said array of electrically conducting lines reconnected by said deposit in said fan-out region comprise a single panel on said at least one of two substrates.

21. A liquid crystal display (LCD) panel, comprising:
first and second substrates coupled together by a seal;
a liquid crystal material formed between said first and second substrates; and
an electrically conducting pattern formed on at least one of said first and second substrates, said electrically conducting pattern comprising an array of electrically conducting lines alternating with open spaces, said conducting lines being opaque to optical radiation, each of said conducting lines being open in a specified region and reconnected by a separate deposit overlapping both ends of said electrically conducting lines,
said deposit comprising optically transparent or partially transparent electrically conducting material that restores electrical continuity of.said conducting lines and such that said conducting pattern in a region of said seal comprises a material at least transmissive to radiation for curing said seal under said pattern, in at least the region of the seal, to couple said first and second substrates together,
wherein said array of electrically conducting lines includes metal lines leading from a transistor to a peripheral region of one of said first and second substrates at which said seal is applied, and
wherein said electrically conducting lines are reconnected by said deposit in a fan-out region.

22. A method of forming a liquid crystal display panel, comprising:
forming an electrically conducting pattern on at least one of first and second substrates to be coupled together;
forming a liquid crystal material between said first and second substrates;
coupling together said first and second substrates with a seal;
curing said seal with radiation,
wherein said electrically conducting pattern comprises an array of electrically conducting lines alternating with open spaces, said conducting lines being opaque to optical radiation, each of said conducting lines being open in a specified region and reconnected by a separate deposit overlapping both ends of said electrical lines,
said deposit being at least partially optically transparent electrically conducting material that restores electrical continuity of said conducting lines,
wherein said array of electrically conducting lines includes metal lines leading from a transistor to a peripheral region of one of said first and second substrates at which said seal is applied, and
wherein said electrically conducting lines are reconnected by said deposit in a fan-out region.

23. The method of claim 22, wherein a material of said deposit is patterned in one step to include a portion for an interior of said substrates as well as portions for a peripheral edge thereof.

24. An electrically conducting pattern on at least one of two substrates to be combined with the other of the two substrates via a seal, said pattern comprises:
an array of electrically conducting lines alternating with open spaces, each conducting line of said array of electrically conducting lines being opaque to optical radiation and open in a specified region; and
a deposit overlapping both ends of said electrically conducting lines in said specified region to reconnect said each conducting line, said deposit comprising an optically transparent electrically conducting material that restores electrical continuity of said conducting lines and is at least partially transmissive to radiation required for curing said seal to affix said two substrates,
wherein said array of electrically conducting lines includes metal lines leading from a transistor to a peripheral region of one of said substrates at which said seal is applied, and
wherein each of said electrically conducting lines open in said specified region comprise fan-out lines in a fan-out region.

* * * * *